United States Patent [19]

Mayes

[11] 3,940,174

[45] Feb. 24, 1976

[54] POULTRY TRAILER

[76] Inventor: Frank E. Mayes, Rte. No. 1, Farmington, Ark. 72730

[22] Filed: Jan. 31, 1974

[21] Appl. No.: 438,444

[52] U.S. Cl. ................. 296/3; 119/12; 119/21; 211/1.5; 211/126; 296/24 C
[51] Int. Cl.² ............................................ B60P 3/00
[58] Field of Search .......... 296/3, 27, 24 C; 119/12, 119/21; 211/1.5, 126; 271/64, 173; 312/306, 308

[56] References Cited
UNITED STATES PATENTS

| | | | |
|---|---|---|---|
| 2,613,931 | 10/1952 | Singer | 211/1.5 |
| 3,001,845 | 9/1961 | Thompson | 312/308 |
| 3,460,864 | 8/1969 | Piercy | 296/3 |
| 3,570,682 | 3/1971 | Elliott | 211/126 |
| 3,674,305 | 7/1972 | Steary | 296/27 |
| 3,677,600 | 7/1972 | Charron | 296/27 |

Primary Examiner—Robert J. Spar
Assistant Examiner—Donald W. Underwood
Attorney, Agent, or Firm—Clarence A. O'Brien; Harvey B. Jacobson

[57] ABSTRACT

A trailer mounted poultry storage rack including a plurality of spaced vertically extending support posts. Each support post slidably mounting a series of collars thereon. Each collar in turn supports a pair of laterally extending support arms. The collars are selectively extensible relative to each other along the post with aligned support arms on adjacent posts cooperating in the support of poultry baskets therebetween.

7 Claims, 6 Drawing Figures

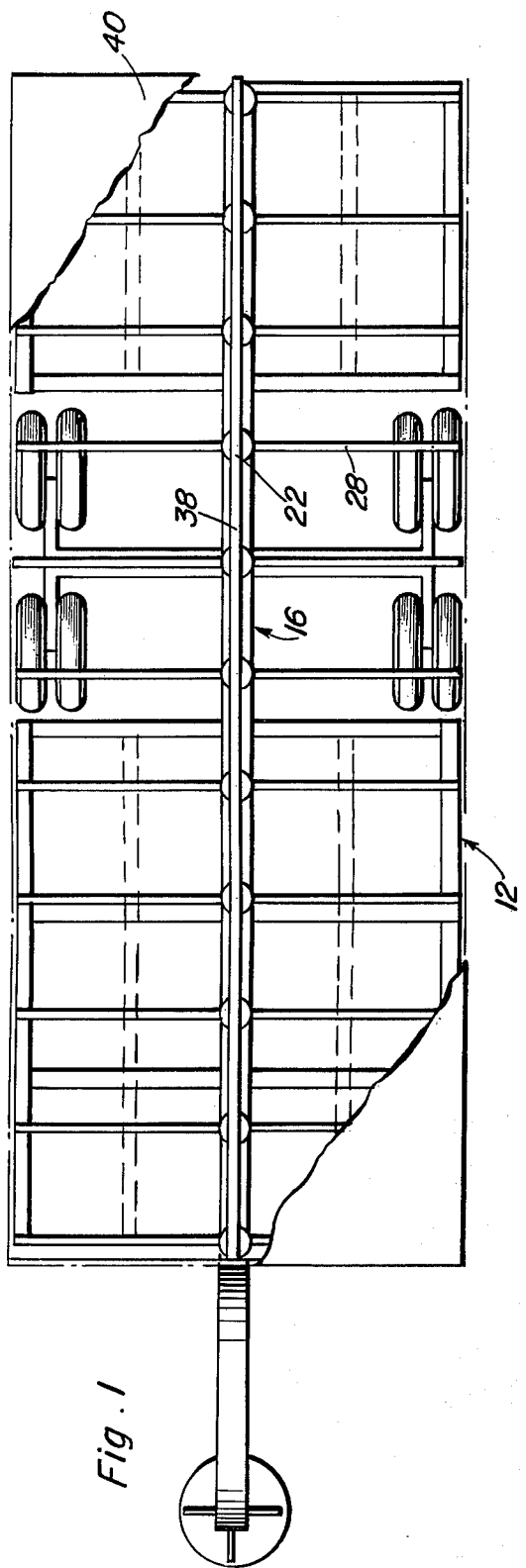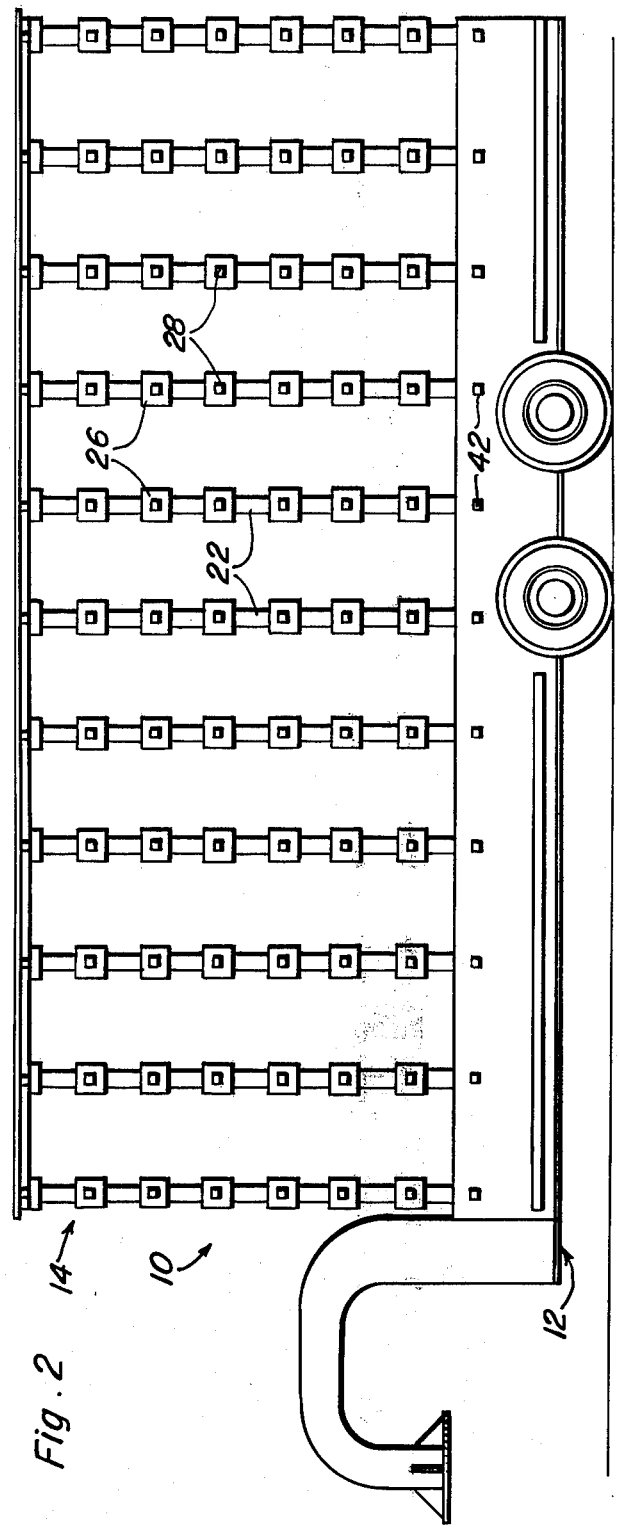

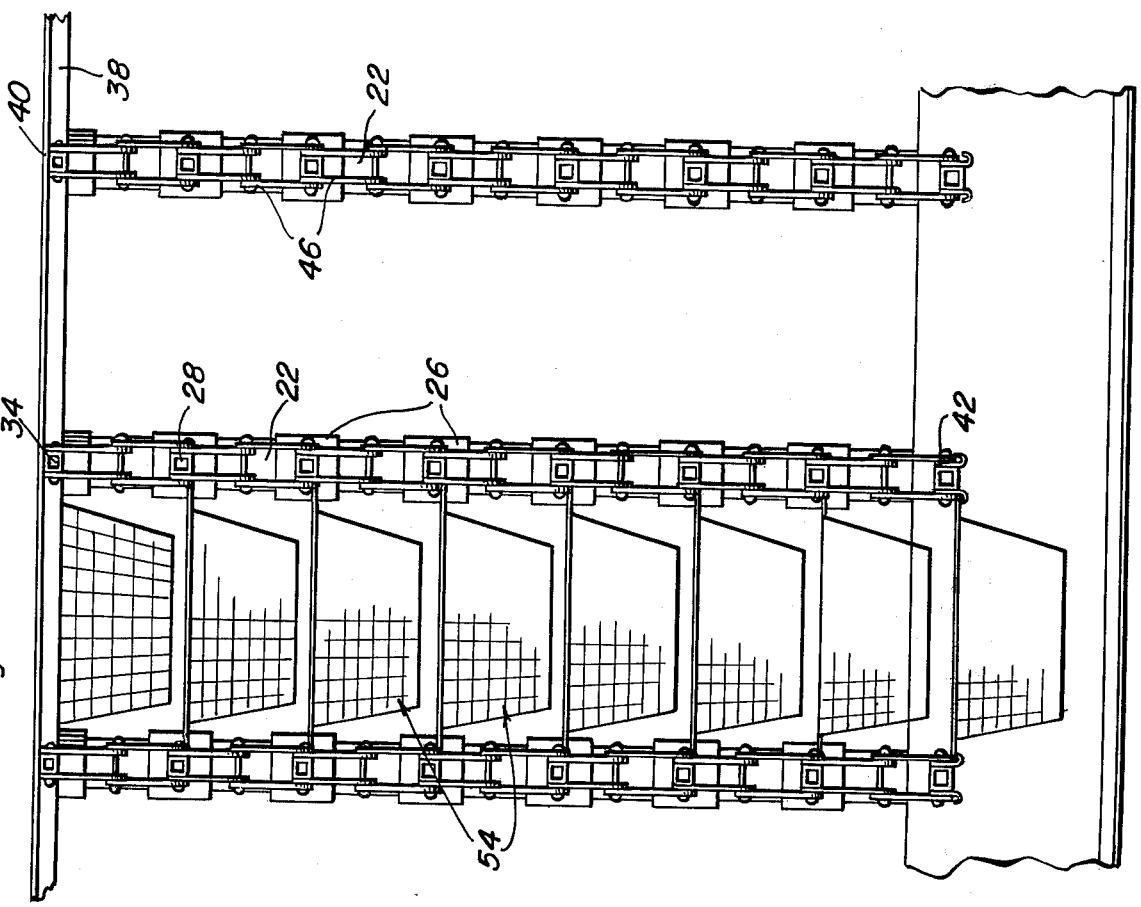
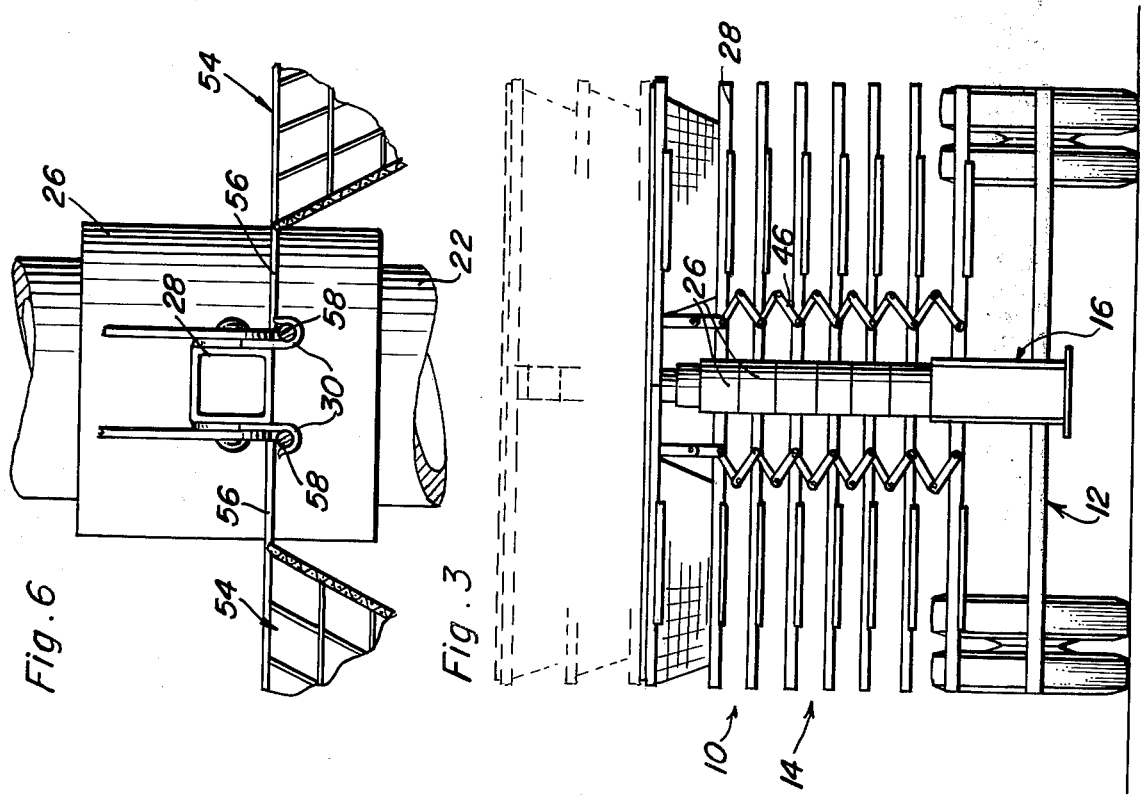

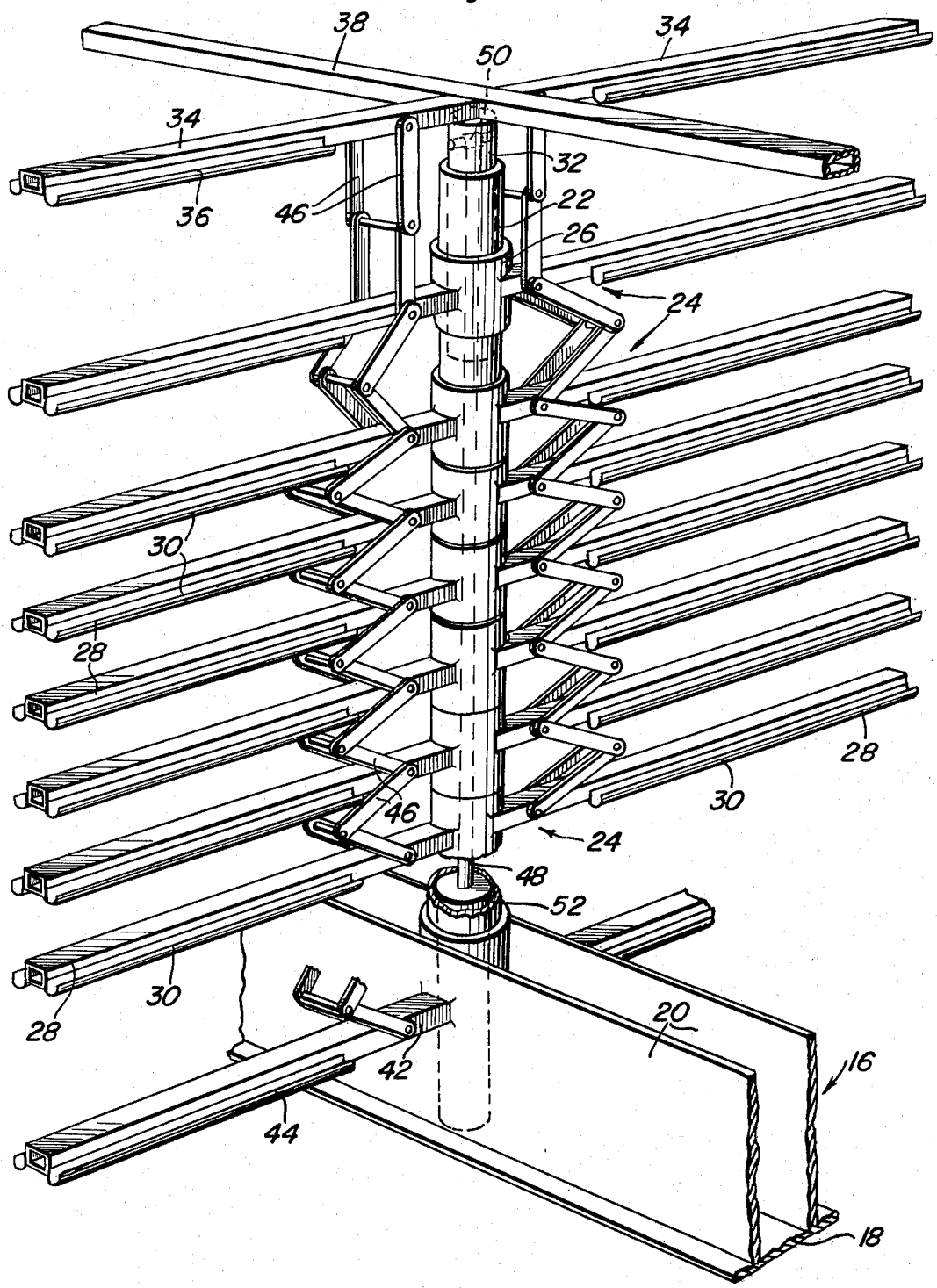

POULTRY TRAILER

The present invention is concerned with new and useful improvements in equipment for transporting live poultry.

More specifically, the invention is concerned with means for transporting poultry in large numbers in a safe and efficient manner.

In conjunction therewith, it is among the objects of the invention to provide a poultry trailer storage rack which can be easily and efficiently loaded, normally directly in the poultry building itself, with the poultry receiving baskets being easily accessible, avoiding excessive effort on the part of the poultry loaders and at the same time avoiding injury to the poultry.

Basically, the objects of the invention are achieved through the provision of a collapsible poultry storage rack which, in the collapsed position thereof, supports empty poultry baskets in closely nested relation with each other. Upon an extension of the rack into the poultry loaded position thereof, the racks are moved out of nested relationship with each other and maintained in an overlying stacked relation whereby each acts so as to define a lid for the subjacent basket. The extension of the rack is, through power means, performed in a step-by-step manner wherein each superjacent basket is loaded at the nested height thereof and then elevated so as to clear and allow filling of the subjacent basket. This is effected through the utilization of a plurality of vertically extending support posts which in turn mount arm supporting collars. The arms of adjacent posts support the baskets therebetween with the controlled elevating of the collars effecting the vertical raising of the baskets during the loading procedure.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view, with portions broken away for purposes of illustration, of a poultry trailer constructed in accordance with the instant invention;

FIG. 2 is a side elevational view of the poultry trailer;

FIG. 3 is an end elevational view of the poultry trailer;

FIG. 4 is an enlarged elevational detail of the poultry trailer with the rack in its extended loaded position;

FIG. 5 is a perspective detail of the main components of the rack; and

FIG. 6 is a sectional detail of the various support components.

Referring now more specifically to the drawings, reference numeral 10 is used to generally designate the poultry trailer comprising the present invention. This trailer 10 consists basically of a wheel mounted chassis or load bed 12 and a poultry storage rack 14 mounted thereon.

The chassis 12 includes an elongated central main frame section or beam 16 formed of an elongated flat base plate 18 and a pair of vertically extending laterally spaced parallel side plates 20. An odd number of support posts 22, normally eleven in number, are provided at equally spaced points along the center frame member 16 and fixed between the side plates 20 in any appropriate manner so as to extend vertically upward therefrom.

Each of the posts 20, which are hollow and tubular in nature, mounts a series of stacked support units 24 thereon for vertical sliding adjustment therealong. Each of the support units 24 includes a collar 26 received about the corresponding post 22 and vertically slidable thereon. Each collar has a pair of diametrically opposed tubular support arms 28 rigidly affixed thereto and cantilevering outwardly therefrom so as to extend generally transversely of the length of the poultry trailer 10. Affixed to the opposed vertical faces of each of the support arms 24 is an elongated upwardly directed support channel 30.

An elongated hollow pipe section 32 is telescopically received within the open upper end portion of the support post 22 with this section 32 projecting thereabove and mounting a pair of diametrically opposed outwardly extending support arms 34 similar to and aligned with the underlying support arms 28. Each of the support arms 34 also mounts a pair of opposed upwardly directed elongated support channels 36. An elongated stabilizing brace 38 extends longitudinally along the top of the rack and is affixed to and interconnects the post extension sections 32 coplanar with the uppermost transversely extending support arms 34 so as to both stabilize the posts 32 and act, in conjunction with the upper support arms 34, as a means for supporting an appropriate top cover 40. A final set of support arms 42 is affixed to the opposed side plates 20 and project laterally outward therefrom in vertical alignment with the support arms 28 associated with each support post 22. These arms 42 also incorporate the support channels 44.

Each arm, from the uppermost arms 34 to the lowest collar mounted arms 28 are connected to the next subjacent arm by two pairs of links 46 pivoted to each other at one end and to the respective arms at the opposite ends thereof for movement between a fully extended position as illustrated in conjunction with the uppermost links in FIG. 5 and a collapsed position as illustrated with the lower ones of the sets of links. The sets of links immediately below the fully extended upper links in FIG. 5 are illustrated in a partially expanded position. It will be noted that the links 46 are positioned toward the inner ends of the respective support arms, inward of the support channels.

The upper pipe section 32 telescopically received within the upper end of the support post 22 has the upper end portion of an elongated piston rod 48 telescoped therein and fixed thereto, this secured upper end of the piston rod 48 being designated by reference numeral 50. The lower end of the rod 48 is received within a hydraulic cylinder 52 fixed within the lower portion of the corresponding post 22. The control of the hydraulic lift system associated with all of the posts 22 will preferably be synchronized with the actual system being of a conventional nature supplied, as one example, from the cab utilized to pull the trailer. The extent of vertical movement of the rod 48 and associated piston within the cylinder 52 will be such so as to provide for a complete extension of the rack 14 as shall be explained presently.

Basically, a step-by-step extension of the rods 48 will effect a sequential elevating of the support commencing with commencingwith the upper arms 34 and progressing downward as suggested in FIG. 5. Initially, the pipe section 32 will be elevated to the full extent of the uppermost sets of links 46. Continued extension of the rod 48 will, through the uppermost sets of links 46, raise the next lower support unit until the links 46 depending therefrom are also fully extended. This procedure continues until the rack is fully extended as illustrated in FIG. 4 with the lowermost sets of links engaged between the fixed beam mounted arms 42 and the collar mounted arms 28 immediately thereabove tending to lock the support units in the fully extended position thereof.

The poultry baskets 54 have tapered bodies and oppositely projecting upper handle portions 56 terminating in downturned edge flanges 58 which engage within a pair of opposed support channels on adjacent support post assemblies. The tapered nature of the baskets allows a nesting of the baskets in the collapsed position of the storage rack as illustrated in FIG. 3 with the baskets, in the extended position of the rack as illustrated in FIG. 4, each being spaced slightly above the subjacent basket so as to allow full utility of the interior of the basket for the poultry while at the same time providing in effect a cover therefor. The uppermost baskets are of course covered by the top member 40.

The poultry trailer 10 is particularly constructed for loading inside a poultry building with the low slung nature of the chassis 12 allowing easy access to the rack for loading purposes with it being contemplated that the fully extended height of the rack be approximately seven feet ten inches. By providing for a poultry trailer which can be moved directly into the poultry building, it will be appreciated that the trailer can be loaded regardless of outside weather conditions. Further, there will be no necessity for carrying the poultry long distances to a remote trailer as is now frequently required.

In the actual loading of the trailer, the upper tier of baskets 54 is loaded first with the rack in its fully collapsed position. In this manner, the men can easily drop the poultry directly into the open baskets without requiring the opening of doors, the removal of lids, or the like. This actual loading of the poultry into the baskets is facilitated by outwardly sliding the baskets on the elongated support channels so as to clear the open top of the basket from any superimposed structure. Once the individual basket is loaded, it is merely slid back into position beneath the superjacent retaining structure and, preferably, locked in its inwardly slid position in any appropriate manner such as through a simple latch mechanism, not illustrated. As each tier of baskets is filled, it is raised so as to expose the subjacent tier of baskets which are then slid outwardly on their respective support channels for easy accessibility. In sequentially loading the baskets in this manner, it will be appreciated that the baskets being loaded are always at their lowestmost level easily accessible directly from the ground with the baskets, when outwardly slid on the support channels, having a substantially completely exposed top through which the poultry can be easily dropped into the baskets. In addition to the ease with which the poultry can be loaded, it will be appreciated that damage to the poultry is greatly reduced in that it is no longer necessary to introduce the poultry through doors, small openings, etc. When the rack is fully loaded, the basket supporting units are in effect suspended from the associated support posts with the individual poultry baskets being supported therebetween in a manner which positively confines the poultry while at the same time positioning the baskets for easy access thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A poultry storage rack comprising a base, a plurality of elongated upright vertically extending supports supported at their lower end portions from said base at points spaced therealong, said supports each including means at least partially enclosing a passage defined thereby extending longitudinally thereof and having a series of horizontally extending support units for the support of a poultry basket therefrom mounted on the exterior thereof and spaced one above the other for vertical adjustment therealong, each support unit consisting of at least one support arm cantilevered outward from its support, lost motion connecting means connecting each support unit to the support unit therebelow for upward displacement of the lower unit with the unit thereabove in response to elevation of the upper unit a predetermined distance above the lower unit and allowing downward displacement of the upper unit relative to the unit therebelow below a level spaced said predetermined distance above the lower unit; elevating means extending along each of said passages and connected between the corresponding upright support and the associated upper support unit for raising and lowering the latter relative to said support said elevating means being operable in unison.

2. The rack of claim 1 wherein each support unit is connected to the next higher support unit by collapsible elements comprising said connecting means, said support units being movable between a first downwardly shifted stored position on the support with the collapsible elements folded therebetween and a second upwardly shifted position with the collapsible elements fully extended therebetween.

3. A poultry storage rack comprising a base, a plurality of vertically extending support posts fixed to the base at spaced points therealong, each post having a series of support units mounted thereon for vertical adjustment therealong, each support unit including a horizontally projecting support arm fixed thereto and projecting laterally of the post for the support of a poultry basket therefrom, and means for vertically adjusting said support units on said support post, each support unit being connected to the next higher support unit by collapsible elements, said support units being movable between a first downwardly shifted stored position on the post with the collapsible elements folded therebetween and a second upwardly shifted position with the collapsible elements fully extended therebetween, said collapsible elements, in the fully extended second position, suspending each subjacent support unit from the next superjacent unit, each support unit including a collar slidably received about the post and a pair of diametrically opposed horizontally projecting support arms fixed thereto and cantilevered outward therefrom.

4. The rack of claim 3 wherein the means for vertically adjusting said support units includes a hydraulic unit mounted within the post and operatively engaged with the uppermost support unit for a vertically upward extension thereof and a corresponding upward raising of the lower support units by said collapsible elements between said units.

5. The rack of claim 4 wherein each support arm has as elongated upwardly directed support channel fixed along the opposed sides thereof for the supporting reception of a basket edge portion therein, aligned arms on adjacent support posts being adapted to support opposed edge portions of a basket suspended therebetween.

6. The rack of claim 5 wherein said base comprises a wheel mounted chassis.

7. The rack of claim 4 wherein each support unit is elevatable relative to and independently of the subjacent support unit for a sequential step-by-step raising of the support units.

* * * * *